Nov. 6, 1945.  R. A. HIGONNET ET AL  2,388,264
APPARATUS FOR COPYING DOCUMENTS AND THE LIKE
Filed April 24, 1942  2 Sheets-Sheet 1
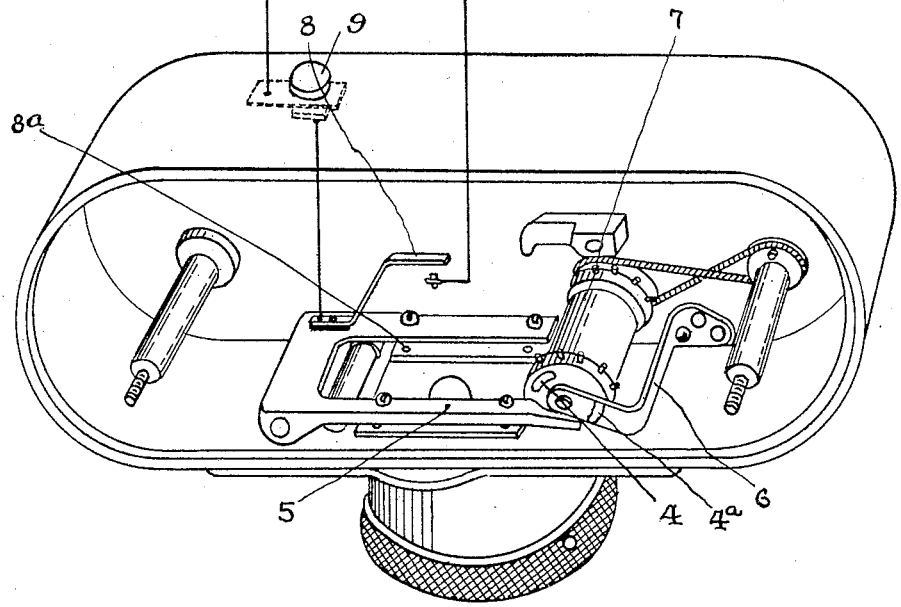
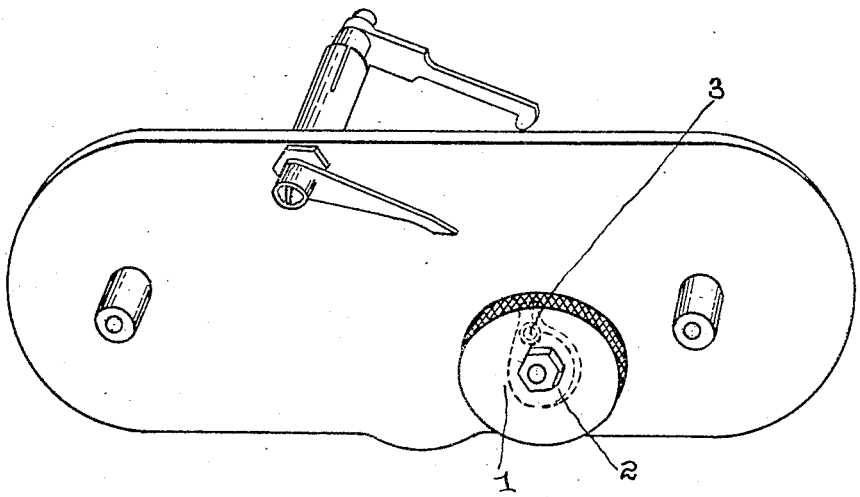
INVENTORS
LOUIS N. CHEREAU
RENE A. HIGONNET
BY
ATTORNEY

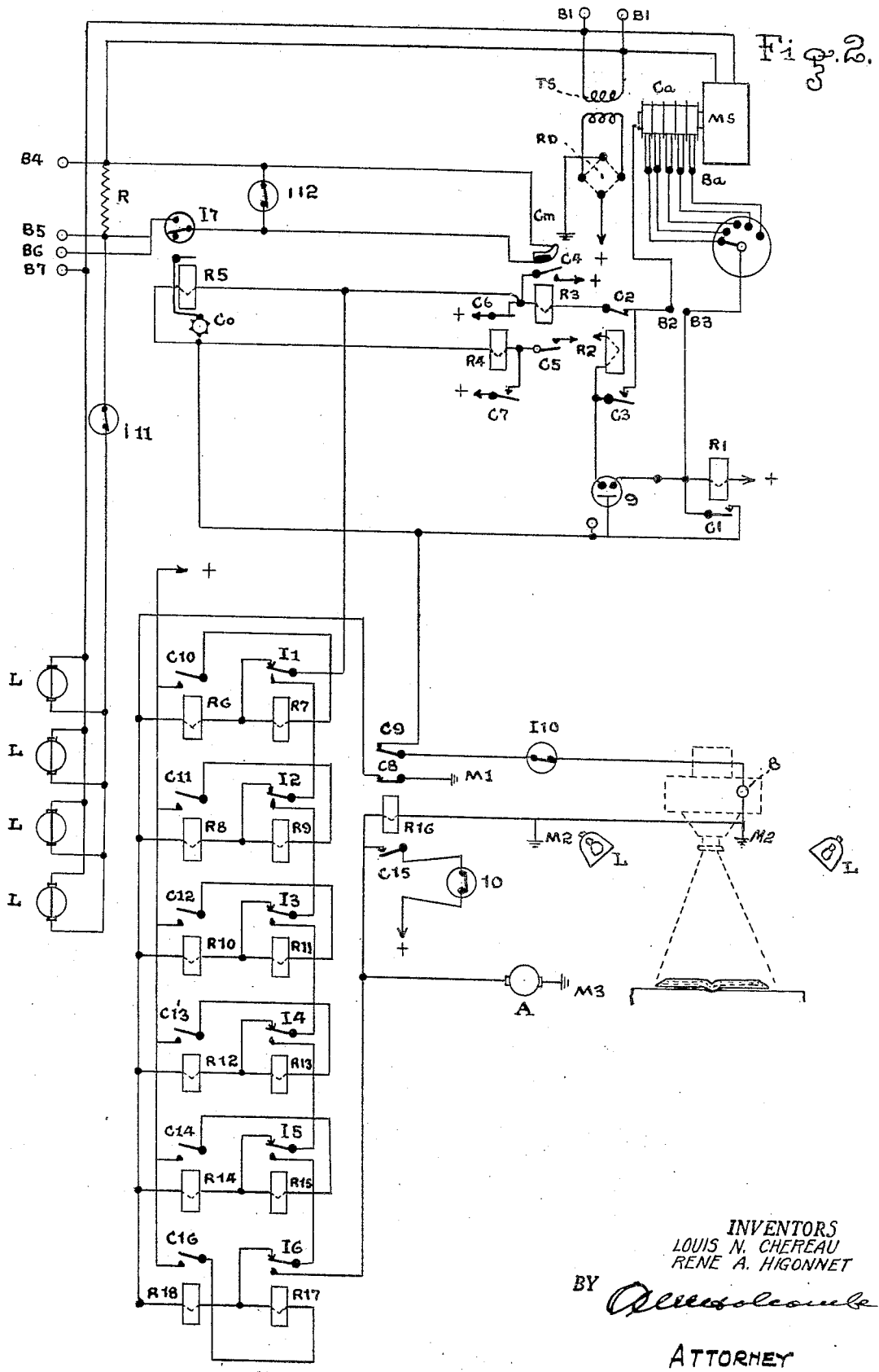

Patented Nov. 6, 1945

2,388,264

UNITED STATES PATENT OFFICE 2,388,264

APPARATUS FOR COPYING DOCUMENTS AND THE LIKE

René Alphonse Higonnet and Louis N. Chereau, Lyon, France; vested in the Alien Property Custodian Application April 24, 1942, Serial No. 440,418
In France November 18, 1941

4 Claims. (Cl. 88—24)

This invention relates to an apparatus for the reproduction of documents, particularly for the taking of photographs on a continuous strip, and more especially to a device that makes it possible to photograph on a film pages of texts or figures or other objects. More especially, on a standard 35 mm. film it is possible to photograph two pages of text each having a size of 18 x 24 corresponding to the standard picture of the silent screen.

The use of standard film makes it possible to utilize the facilities provided by the film industry, more especially those of developing and making reproductions or copies.

According to certain features of the invention, control of the exposure time is effected by purely electric improved means; these means permit variation of the exposure time by the mere manipulation of a knob. A relay circuit is provided for the purpose of preventing double exposures.

According to one embodiment, the camera does not contain any mechanical shutter, the mechanical control of which might cause a slight vibration that would injuriously affect the sharpness of the picture. The tubes are lighted to dark red in the usual way and are automatically stepped up in voltage for the photographing. According to other features of the invention, use is made of an electrically controlled shutter. For the filing of the films it is advisable to divide them into strips, e. g. of 6 pictures, 5 being reserved for the text, i. e. for 10 pages, and one picture being reserved for a reference that can be photographed on the film in large letters visible to the naked eye as soon as the pictures have been taken.

In order to permit the operator to do this work, there is provided a metering circuit which gives a signal after the 5th picture, thus warning the operator that he must reserve the following shot for photograph of the reference of the following series. This metering relay consists, for example, of a chain of relays which look successively after each picture and finally actuate a relay that cuts off the lighting circuit of the tubes or else actuates a relay or some other device so as to warn the operator. Other metering systems may also be used.

The invention is explained hereunder in the description of embodiment examples given with reference to the appended drawings, in which:

Fig. 1 is a schematic view in perspective of a camera for photographing on microfilms, according to the invention.

Fig. 2 is a diagram of the automatic electric control of the exposure time and of the metering system, according to the features of the invention.

Referring to Fig. 1, the advance of the film is effected by means of a claw control, by turning the knob 1.

This knob carries a cam 2 provided with a ramp, and attached to the cam by means of a spring there is a finger 3 which can enter a sloping eyehole 4.

Turning of the knob in clockwise direction first releases the presser 5 which holds the film in place by means of a plate and springs 8a. Then the finger 3 abuts against the bottom of the eyehole 4 and actuates the feeder reel 7 which in its turn draws along the film; after advancing by one frame, the finger abuts against the support 6. By then turning anti-clockwise, the finger 3 comes out of action owing to the slope of the eyehole 4 and the reel 7 remains stationary. At the end of its path of travel, the finger 3 drops into the eyehole 4a, which is symmetrical with the eyehole 4 with respect to the center of the cheek of reel 7, and the presser is pushed by the ramp of cam 2; by tilting the presser, the contact 8 has thus been closed at that moment and the apparatus is ready to operate for another picture. For this it is sufficient to press down the button 9.

The current feed (network) is connected to the terminals B1 from where the current actuates a synchronous motor MS, which serves for furnishing well determined illumination times, and also feeds the tubes L across the resistance R. It is by short circuiting this resistance that the intense luminous flux that permits the photographing is obtained. The rectifier RD, which has one outlet terminal (—) grounded, is fed by means of the transformer T5. The camera's commutator 8 has also one terminal grounded. Depression of the button 9 actuates relay R1 which closes contact C1 and this contact will remain blocked as long as contact 8 is closed. There are two cases to be considered:

*1st case.*—Upon depressing the button 9, the cams Ca are in such a position that the circuit B2, B3 is closed by means of Ca. If it is desired to have the exposure time that has been determined upon, the apparatus will have to wait until Ca passes again before operating. This is obtained in the following way: Depression of the button 9 actuates relay R2 which closes contact C3 and opens C2.

If the circuit b2, b3 is closed by Ca, relay R2 will be blocked, because the current will pass through R2 and C3 to close again over ground. C2 will accordingly remain open and the mercury contact Cm will be isolated. As soon as the motor has rotated by an angle sufficient for breaking the contact Ca, relay R2 will cease operating and, as soon as contact Ca is made again, the current will pass through R5 on to ground and cause the tilting of the mercury switch Cm which will short circuit the resistance R and step up the voltage of the tubes L, thus making it possible to photograph. This will continue as long as Ca closes the circuit, i. e. during a predetermined angle of rotation of the motor.

*2nd case.*—Depression of the button 9 places the cams Ca in such a position that the circuit b2, Ca, b3 is open.

In this case, relay R2 ceases to operate as soon as the button 9 is released. As soon as the cams Ca establish the contact, the circuit will be closed by passing across relay R3 which actuates the mercury switch, and the voltage of the tubes L will be stepped up, as explained above.

The device described hereunder prevents double exposures.

Relay R3 which controls the mercury switch can not operate when contact C4 is open except when contact C6 is closed; as soon as cams Ca permit passage of the current, relay R3 operates and closes contact C4 as well as contact C5. Since contact C5 is closed, relay R4 will operate in its turn and will open contact C6 and close contact C7. Since, by passing over the contact C7, the current can then directly reach the positive pole of the battery, relay R4 will be blocked as long as the circuit M2, C9, C7 is closed, i. e. as long as contact 8 is closed. Relay R3, which operates as long as the cams Ca allow current to pass, will return to rest as soon as these cams permit no more current to pass, i. e. when the exposure has been made.

If, after the exposure, the button 9 is again depressed without having broken the contact 8, i. e. without having advanced the film, relay R3 will not be able to operate, because the circuit can not close again either over contact C4, which is in the resting position and consequently open, or over contact C6 which is actuated by relay R4 which is blocked, as explained above. It will therefore be absolutely necessary to advance the film before being able to take another photograph.

The operation of the metering device is as described hereunder. The circuit closes over the ground M1 after having passed through contact C8, relay R6 which controls contact C10, commutator I1, and contact C6. Relay R7 is then branched on two + and does not operate. As already explained above, the photographing is done when the mercury switch Cm tilts upon being actuated by relay R3. This relay likewise closes contact C4 and contact C5. As soon as contact C5 closes, the current passes through relay R4 which it actuates. This relay R4 opens contact C6 and closes contact C7. From this moment, relay R4 will be blocked as long as switch 8 remains closed, because the circuit M2, 8, C9, R4, C7 will be closed; the operation of relays R3 and R4 has not affected the metering circuit except in that the current is closed over C4 instead of being closed over C6. The current will accordingly pass through relay R6, commutator I1 and contact C4 as long as the photographing continues, i. e. as long as relay R3 is actuated.

As soon as the photographing is completed, contact C4 will be broken owing to relay R3 being no longer actuated and, since the current proceeding from relay R6 can no longer reach the positive pole over commutator I1 and contact C4, it will have to reach the positive pole through relay R7 and contact C10, which is closed as explained above.

Operation of relay R7 causes operation of commutator I1 which immediately places commutator I2 in communication with contact C4.

According to certain features of the invention, contact 8 is automatically broken as soon as the film is advanced by one frame, and this will cause relay R4 to fall back to its resting position and will reestablish contact C6. At this moment, relay R8 will operate as described above for relay R6 and, also as indicated above, contact C4 be made and contact C6 will be broken at the start of the second photographing and, when the second photograph is taken, i. e. as soon as contact C4 is broken, commutator I2 will operate in the manner described for commutator I1, and so on until the 6th photograph is taken.

When the knob is turned to advance the film by one frame before the 6th picture, relay R18 will be actuated in the manner described above for relay R8, and contact C16 will be closed.

After the 6th picture has been taken, relay R17 and commutator I6 will operate in the same manner as indicated for relay R7 and commutator I1. As soon as the film is again advanced by one frame, i. e. before the 7th picture is taken, relay R4 will return to rest in the already explained manner and contact C6 will be made. The current proceeding from M3 will pass through the alarm A, which may be any instrument or device actuated by the electric current, and will reach the positive by passing over the commutators I5, I4, I3, I2, I1 and contact C6. The current will thus close over the ground M2, passing through relay R16 which it will actuate. This relay will close contact C15 and will be blocked until button 10 is depressed. When relay R16 comes into operation, it opens contacts C8, which will bring back the metering device to zero, and contact C9 which will make it impossible to take any new pictures until the button 10 has been depressed and relay R16 has thus been brought back to the resting position.

The operator's attention is thus positively called and he will know that the next picture must be reserved for the reference legible to the naked eye which is to characterize the subsequent strip of 6 pictures.

Relay R5 can actuate a general totalizing meter Co which operates in the following manner.

When the contact 8 is closed, the circuit M2, 8, C9, R5, C6, is closed and relay R5 comes into operation. As soon as contacts C4 and C6 open, i. e. upon taking a picture, the circuit is opened and relay R5 ceases to operate. On returning to its resting position it has advanced the meter Co by one tooth, i. e. by one unit, and since this mechanism repeats every time that the mercury switch tilts, the total number of pictures taken will be registered on the meter Co.

It is evident that the metering system employed may be different from the one that has just been described as an example. In particular, use may be made of devices such as step by step selectors of the kind used in automatic telephony. These instruments may be disposed so as to advance by one step after each picture and give a signal at the end of each series of 5 pictures.

According to certain features of the invention, the terminals $b4$, $b5$, $b6$, $b7$ make it possible to use the automatic control circuit of the mercury switch for other purposes.

By opening $C11$ it is possible to branch between $b4$ and $b5$ any device that has to be stepped up in voltage for a definite time. In this case, use is made of the resistance $R$, this resistance being cut out of circuit by manipulating the commutator $17$. It is then possible to branch between the terminals $b6$ and $b7$ any device that has to receive an electric current at a given moment for a definite time.

More particularly, it is possible to branch between these terminals an enlarging system that comprises a means for automatic advance; this will permit the making of enlargements of a film at as rapid a speed as the photographing, i. e. 500 to 600 pages per hour, for example.

The camera may also be used for this purpose by placing a lamp and an optical system in a suitable position within it.

When it is a question of reproducing a large number of documents it is thus possible to attain a speed considerably greater than that of other devices, although having to use a negative, and there is the further advantage of having the final document in the form of a positive.

In particular, the operation of the apparatus may be made entirely automatic, e. g. by operating the film's advance device by an electrically controlled plunger or motor mechanism. The control of the manipulating button may be combined with the device for holding the two pages of a book in one plane. If this device comprises a sheet of glass applied against the volume, it will be sufficient to have its switch controlled.

If it is desired to avoid the fatigue resulting from the succession of flashes, use may be made of a shutter, as provided. According to certain features of the present invention, this may consist of a movement of the kind used in movable frame measuring instruments, the frame carrying an extremely light aluminum vane that blocks the luminous beam.

Transmission of a current causes the frame to turn and the vane moves aside, permitting the exposure. This device prevents all vibration, since the vane reaches its shifted position without vibration and without striking against any stop.

Although the present invention has been described in connection with examples of embodiment, it is evident that it is by no means limited to the said examples and that the same are capable of numerous variations and modifications without departing from the scope of the invention.

*Summary*

The present invention relates to photographic reproduction apparatuses and in particular to apparatuses that use moving picture film and have automatic electric control devices that prevent double exposures, and that give the operator a signal for each series of 10 pages photographed, e. g. to warn him to insert a reference that serves for the later filing of the films per series of 10 pages in special index files.

We claim:

1. A photographic apparatus of the character described comprising a camera having film advancing means and automatic light controlling means therefor comprising a feed circuit, a timing circuit closing device, a control circuit connected in series with the timing device, an illumination circuit and lamps connected to be energized thereby, circuit connections to control the energizing of lamps including a controlled lighting switch, a relay in the control circuit for operating the light switch, shunt connections in the control circuit and a relay operated thereby and arranged in blocking relation to the light switch relay to effect resetting thereof to open position, to insure full time period of lighting, a second circuit in shunt relation to the light switch relay and operatively connected thereto to permit re-energizing of the light switch relay only after opening of the control circuit, whereby double exposure of said film is prevented, a camera switch connected in series with said control circuit and said shunt-connected circuit, means for closing said camera switch at the end of each film advance, comprising a contact located in said camera, means mechanically connecting said film advancing means to said contact whereby said contact is opened only when film advance occurs, and relay means controlled by said contact and opening said shunt circuit prior to each film advance.

2. A photographic apparatus of the character described comprising a camera having film advancing means and automatic light controlling means therefor comprising a feed circuit, a motor driven thereby, timing contacts actuated by the motor, a control circuit connected in series with the timing contacts, an illumination circuit including a series resistance and lamps connected to be energized by said circuit, circuit connections for shunting the resistance including a controlled light switch, a relay in the control circuit for operating the light switch, shunt connections in the control circuit and a relay operated thereby in blocking relation to the light switch relay to effect resetting thereof to open position to insure full time period of lighting, a second circuit in shunt relation to the light switch relay and having a relay controlled switch operative to permit re-energizing of the light switch relay only after opening of the control circuit and a camera switch connected in series with the control and shunting circuits and operative to be closed only at the end of each film feed movement.

3. A photographic apparatus of the character described comprising a camera having film advancing means, and automatic light controlling means therefor comprising a feed circuit, a timing circuit closing device, a control circuit connected in series with the timing device, an illumination circuit and lamps connected to be energized thereby, circuit connections to control the energizing of the lamps including a controlled lighting switch, a relay in the control circuit for operating the light switch, shunt connections in the control circuit and a relay operated thereby and arranged in blocking relation to the light switch relay to effect resetting thereof to open position to insure full time period of lighting, a multiple relay controlled metering circuit connected to the control circuit for progressive closing of the relay switch contacts, and a signal circuit closed by the last acting switch, a camera switch connected in series with the control and shunting circuits and arranged to be closed at the end of each film advance and to open the shunt circuit prior to each advance of the film.

4. A photographic apparatus of the character described comprising a camera having film advancing means, and automatic light controlling means therefor comprising a feed circuit, a timing circuit closing device, a control circuit connected in series with the timing device, an illumination circuit and lamps connected to be energized thereby, circuit connections to control the energizing of the lamps including a controlled lighting switch, a relay in the control circuit for operating the light switch, shunt connections in the control circuit and a relay operated thereby and arranged in blocking relation to the light switch relay to effect resetting thereof to open position to insure full time period of lighting and a multiple relay controlled metering circuit connected to the control circuit for progressive closing of the relay switch contacts, a signal circuit closed by the last acting switch, and a relay in the signal circuit operating a switch to open the control circuit and to open the meter circuit for resetting thereof a camera switch connected in series with the control and shunting circuits and arranged to be closed at the end of each film advance and to open the shunt circuit prior to each advance of the film.

LOUIS N. CHEREAU.
RENÉ HIGONNET.